United States Patent [19]

Roberts

[11] 4,363,387
[45] Dec. 14, 1982

[54] WHEEL CYLINDER AND TORQUE PLATE CONSTRUCTION

[75] Inventor: James K. Roberts, South Bend, Ind.

[73] Assignee: The Bendix Corporation, Southfield, Mich.

[21] Appl. No.: 289,547

[22] Filed: Aug. 3, 1981

Related U.S. Application Data

[63] Continuation of Ser. No. 93,361, Nov. 13, 1979, abandoned.

[51] Int. Cl.³ .................. F16D 51/52; F16D 65/14
[52] U.S. Cl. .................................. 188/333; 92/168; 92/170; 188/325; 188/341; 188/362; 188/364; 192/75; 192/85 AT
[58] Field of Search ............... 188/364, 363, 362, 361, 188/325, 326, 331, 333, 335, 340, 341; 192/115, 85 AT, 75; 92/168, 170

[56] References Cited

U.S. PATENT DOCUMENTS

| | | | |
|---|---|---|---|
| 2,161,640 | 6/1939 | Schnell | 188/325 X |
| 2,249,139 | 7/1941 | Hollerith | 188/364 X |
| 2,322,121 | 6/1943 | Frank | 188/331 X |
| 2,389,311 | 11/1945 | Hirschman et al. | 188/364 X |
| 2,475,491 | 7/1949 | Goepfrich et al. | 188/364 X |
| 2,678,242 | 5/1954 | Geyer et al. | 92/170 |
| 2,888,879 | 6/1959 | Gaarder | 92/170 X |
| 3,839,946 | 10/1974 | Paget | 92/170 X |
| 4,150,736 | 4/1979 | Marti | 188/332 |
| 4,182,439 | 1/1980 | Kluger et al. | 188/335 |

FOREIGN PATENT DOCUMENTS 2053330 5/1971 Fed. Rep. of Germany ........ 92/170

Primary Examiner—George E. A. Halvosa
Attorney, Agent, or Firm—Paul David Schoenle; Ken C. Decker

[57] ABSTRACT

A wheel cylinder and torque plate construction is provided for a drum brake. The wheel cylinder comprises a molded plastic cylindrical member in a steel shell. The steel shell can be part of a torque plate which can be stamped in two parts which are substantially identical and then affixed together. The torque plate parts have semicylindrical shells which form the wheel cylinder shell when the parts are assembled. The plastic cylinder can be molded in the shell in a suitable die or mold in a plastic molding machine.

3 Claims, 6 Drawing Figures

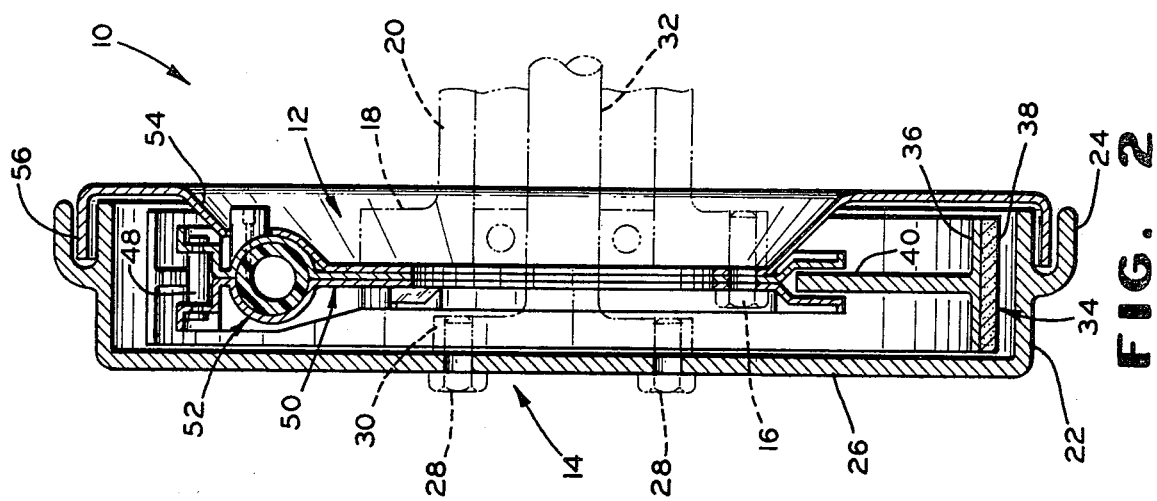
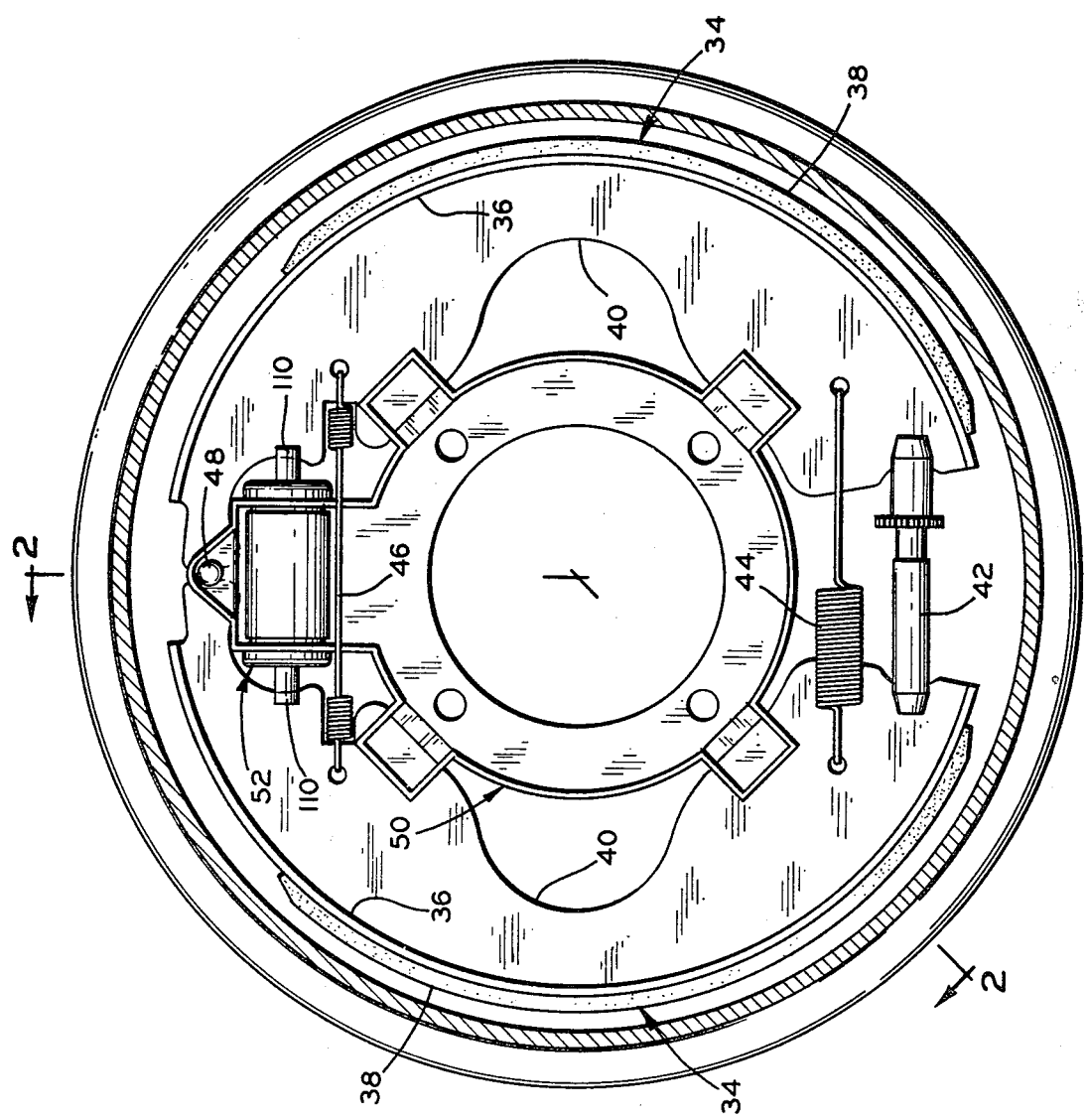

WHEEL CYLINDER AND TORQUE PLATE CONSTRUCTION

This is a continuation of application Ser. No. 93,361, filed Nov. 13, 1979, now abandoned.

This invention relates to a wheel cylinder and a torque plate construction for a drum brake.

A wheel cylinder is commonly produced by casting which requires a number of machining operations and is expensive. The cylinder is also quite heavy. The cylinder is then affixed to a heavy backing plate which is affixed to a rear axle housing of a vehicle. The backing plate is usually stamped.

The present invention provides a wheel cylinder for a drum brake which is made of a plastic cylindrical member molded in a steel shell. The steel shell constitutes part of the mold and also backs up the plastic cylindrical member in the pressurized area so that the maximum pressure is not limited by the strength of the plastic material. Such a wheel cylinder is lighter in weight and eliminates a number of machining operations.

The steel shell of the wheel cylinder can be structurally integral with a torque plate. The torque plate can be made of two substantially identical parts which can be stamped and then suitably affixed together. Such a construction also is lighter in weight than conventional torque plates and can be used with a thin, lightweight dust or splash shield. The two torque plate parts can have semi-cylindrical shells which form the wheel cylinder shell when assembled.

It is, therefore, a principal object of the invention to provide an improved wheel cylinder construction for drum brakes which is lighter in weight and involves fewer machining operations.

Another object of the invention is to provide a wheel cylinder construction which comprises a plastic cylindrical member located in a metal shell.

A further object of the invention is to provide a wheel cylinder and torque plate construction in which the torque plate is made up of two substantially identical stamped parts.

Yet another object of the invention is to provide a wheel cylinder and torque plate construction in which the torque plate is made of two parts, having cylindrical shells forming a shell for the wheel cylinder, when the parts are assembled.

Many other objects and advantages of the invention will be apparent from the following detailed description of preferred embodiments thereof, reference being made to the accompanying drawings, in which:

FIG. 1 is a schematic front view in elevation of a drum brake with the front of the brake drum eliminated;

FIG. 2 is a schematic view in transverse cross section, taken along the line of 2—2 of FIG. 1, and showing the whole brake drum;

Figure 3:
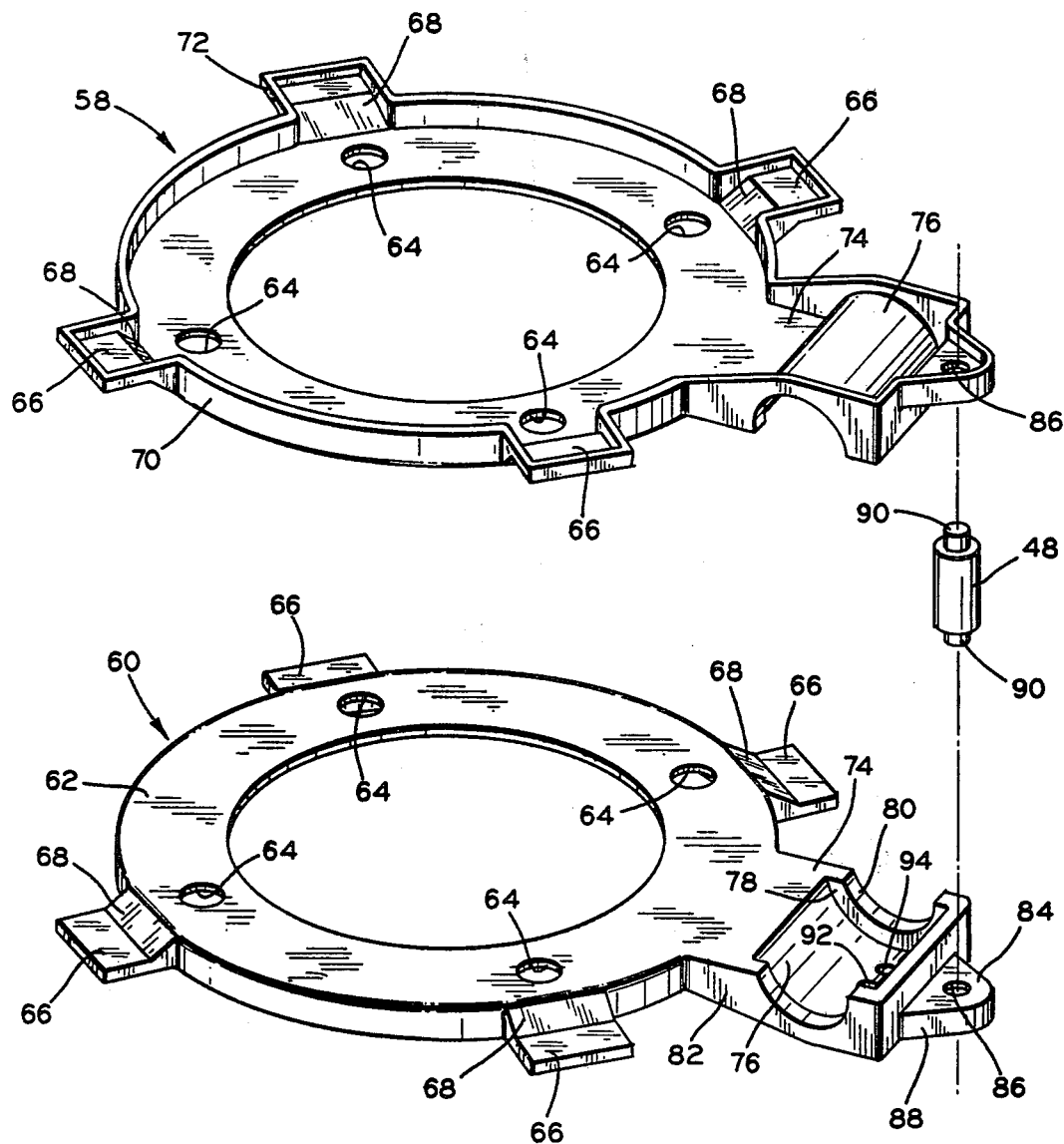
FIG. 3 is an exploded view in perspective showing two parts forming a torque plate for the drum brake.

Referring to FIGS. 1 and 2, a drum brake indicated at 10 is shown for purposes of illustration of the invention and is schematic, with components omitted. The brake includes a stationary assembly 12 and a brake drum 14. The stationary assembly is suitably affixed by bolts 16 or the like to a stationary portion of a vehicle, such as a flange 18 of a rear axle housing 20. The brake drum 14 has an outer cylindrical member 22 with an annular flange 24 and a circular front 26 which is affixed by bolts 28 or the like to a rotating portion of the vehicle, such as a wheel flange 30 of a drive axle 32. The specific drum brake design does not constitute part of the invention.

The stationary assembly 12 includes brake shoes 34 having arcuate portions 36 to which friction linings 38 are affixed. The shoes also have inwardly-extending webs 40 which are perpendicular to the arcuate portions and provide rigidity therefor. The brake shoes have a suitable adjuster 42 and are connected by springs 44 and 46. The brake shoe adjusting system can be of the type shown in U.S. Pat. No. 3,958,674, for example. One of the brake shoes 38 is backed up by an anchor pin 48, depending upon the direction of rotation of the brake drum 14, when the brakes are applied. The stationary assembly 12 also includes a torque plate 50 which holds the anchor pin 48 and a wheel cylinder 52 which moves the brake shoes 38 against the cylindrical member 22 of the brake drum 14. The torque plate and wheel cylinder are constructed in accordance with the invention.

Since the torque plate 50 transmits torque from the brake shoes 38 to the rear axle housing 20, only a thin, light-weight dust or splash shield 54 needs to be employed with the stationary assembly 12. The shield 54 has an outer cylindrical flange 56 which extends between the brake drum member 22 and the flange 24 and serves as protection against water, dust, and other contaminants.

The torque plate 50 includes a front stamped part 58 and a rear stamped part 60 which are substantially identical and which are affixed together by spot welding or riveting, by way of example. The front part 58 has a circular planar portion 62 with spaced bolt holes 64 for the bolts 16 to affix the torque plate to the flange 18 of the axle housing 20 with the dust shield 54 located therebetween. Several ears 66 are set off from the plane of the circular portion 62, away from the rear part 60, by offsets 68. The ears 66 extend along the sides of the brake shoe webs 40 (FIGS. 1 and 2) to provide a guide for the expansion of the webs. Suitable stiffening flanges 70 extend outwardly from the planar circular portion 62 with U-shaped stiffening flanges 72 being located around the ears 66. The front part 58 also has an extension 74 extending radially outwardly and terminating in a semicylindrical shell 76. The shell has a semicircular end wall 78 terminating in a short semi-cylindrical web 80. A U-shaped stiffening flange 82 extends around the shell 76 with an outer edge terminating in an ear 84 with a hole 86 centrally located therein and an extension flange 88 extending therefrom. The hole 86 receives a reduced end 90 of the anchor pin 48 with the reduced end peened over or welded to the ear.

The rear stamped part 60 of the torque plate 50 is substantially identical to the front stamped part 58 except for two nipples 92 and 94 which extend outwardly from the semicylindrical shell 76 thereof. These will be discussed in more detail subsequently.

Figure 4:
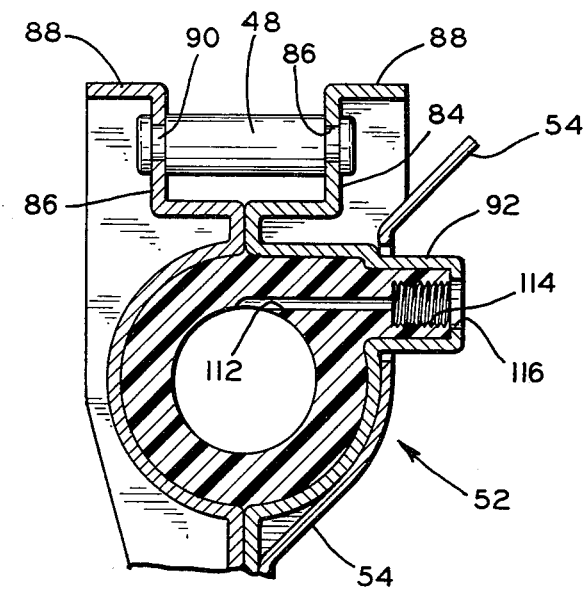
FIG. 4 is an enlarged view in transverse cross section taken generally centrally through a wheel cylinder of a drum brake.
Figure 5:
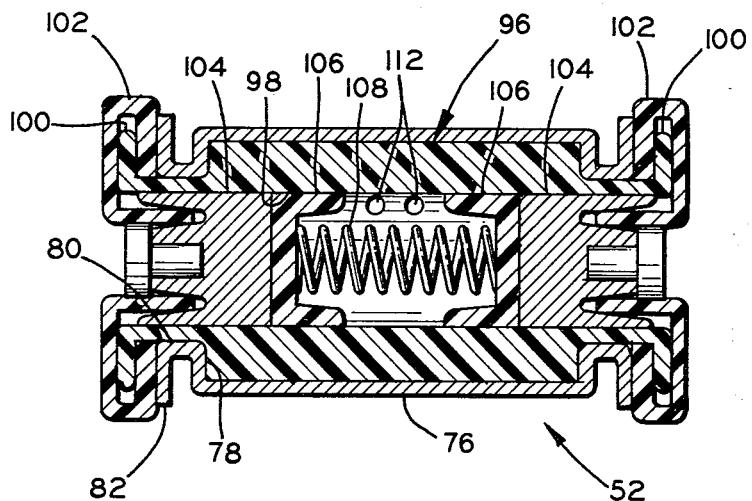
FIG. 5 is a view in vertical, longitudinal cross section of the wheel cylinder.

When the torque plate parts 58 and 60 are assembled, the semi-cylindrical shells 76 match to form a complete shell and are placed in a mold or die which extends beyond the ends of the shell and is also provided with a suitable cylindrical core. Plastic is then injected into the mold to form a plastic cylindrical member 96 (FIGS. 4-6) with a cylindrical inner surface or bore 98 and circular end flanges 100 formed by the mold and positioned beyond the stiffening flanges 82 of the shell 76. Conventional rubber sealing boots 102 can then be mounted on the flanges 100 to seal the ends of the cylinder 52. The boots 102 also cooperate with conventional metal pistons 104 having inner ends engaged by rubber cup seals 106 which are urged outwardly by a spring 108.

When brake fluid under pressure is supplied to the interior to the plastic cylindrical member 96, the cup seals 106 are urged outwardly to move the metal pistons 104 outwardly and thereby move the brake shoes 34 outwardly through pins 110 (FIG. 1). When the pressure in the cylinder 96 is released, the springs 44 and 46 move the brake shoes 34 toward one another away from the brake drum 14 and urge the pistons 104 and the seals 106 inwardly. The central portion of the plastic cylindrical member 96 to which pressure is applied is backed up by the metal shells 76 so that the maximum brake fluid pressure is not limited by the strength of the plastic material.

Two substantially tangential passages 112 are formed in the plastic cylindrical member 96 and communicate with the interior thereof, within the surface 98. One of these passages supplies the brake fluid under pressure to the wheel cylinder 52 and the other provides a vent or bleed for bleeding air from the cylinder. The passages 112 communicate with threaded recesses 114 formed in the plastic material adjacent openings 116 in the nipples 92 and 94. Suitable fittings can be threaded through the openings 116 into the threaded recesses 114 to connect the cylinder with the brake fluid and bleed lines.

Figure 6:
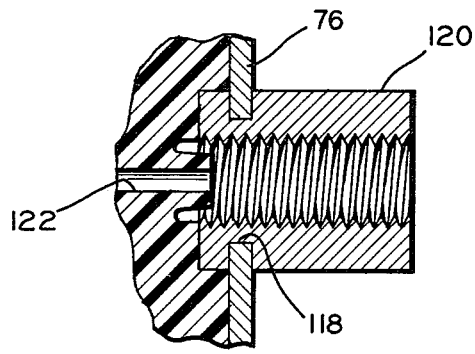
FIG. 6 is a further enlarged fragmentary view showing a modification of part of the wheel cylinder.

An alternative nipple arrangement for connecting the wheel cylinder with fittings is shown in FIG. 6. In this instance the shell 76 has flush openings 118 located in generally similar positions to the nipples 92 and 94. A threaded connector 120 has a small end inserted through the opening 118 and peened over to provide a mechanical connection between the connector and the shell. This is done prior to molding. Suitable passages 122 similar to the passages 112 are then formed in the plastic material after a suitable plug is removed from the threaded connector 120 after the molding operation is complete.

From the above, it will be seen that the wheel cylinder and the torque plate require minimum machining operations as compared to the cast members heretofore employed. Also, the weight of the wheel cylinder and the torque plate is also substantially less than the cast components heretofore employed. The assembly operation of the drum brake components is also reduced when the wheel cylinder and the torque plate are made as one unit. The symmetrical arrangement of the torque plate in mounting the anchor pin also provides a better distribution of forces from the anchor pin to the axle housing flange.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A wheel cylinder and torque plate combination for a drum brake assembly wherein the wheel cylinder receives a pair of pistons, said combination comprising two stamped torque plate parts, each having a central planar portion to be affixed to the other planar portion and to a wheel axle housing or the like, said torque plate parts also having integrally formed matching shells which form a complete cylindrical shell when said parts are assembled, and a plastic member having a cylindrical bore therethrough mounted in said matching shells, said plastic member being substantially enclosed within and contiguously engaging said complete cylindrical shell to prevent expansion of said plastic member, said plastic member cylindrical bore receiving at least one piston to substantially define the wheel cylinder for the drum brake assembly, and said wheel cylinder being defined solely by said plastic member and said torque plate parts for receiving the pair of pistons.

2. A wheel cylinder and a torque plate combination for a drum brake assembly comprising two substantially identical, stamped torque plate parts each having a central planar portion to be affixed to a wheel axle housing or the like, said central planar portion having offset ears extending outwardly therefrom for receiving webs of brake shoes for the drum brake assembly, said torque plate parts having integrally formed matching, generally semi-cylindrical shells which form a complete shell when said parts are assembled, said parts having ears extending outwardly beyond said matching shells for receiving an anchor pin extending therebetween, and a cylindrical plastic member having a bore therethrough mounted in said matching shells, said matching shells substantially encircling and in contiguous engagement with said cylindrical plastic member to substantially prevent distortion of said bore, said bore receiving at least one piston, and said wheel cylinder being defined solely by said plastic member and matching semi-cylindrical shells.

3. A wheel cylinder and torque plate construction for a drum brake assembly including a pair of brake shoes, said construction comprising a pair of substantially identical stampings, each of said pair of stampings including radially extending offset ears which define slots for receiving said pair of brake shoes when said pair of stampings are fastened together, each of said pair of stampings further including a radially extending shell which forms substantially one half of a cylindrical surface, each shell including means to support an anchor when said pair of stampings are fastened together, and a plastic cylindrical member forming a bore for receiving a pair of pistons which are movable during a brake application in response to fluid pressure communicated to said bore, said plastic cylindrical member having an outer cylindrical surface matching with and contiguously engaging said one half cylindrical surfaces whereby said one half cylindrical surfaces cooperate to prevent expansion of said plastic cylindrical member when fluid pressure is communicated to said bore and said pair of stampings are fastened together, each shell including outwardly extending first flanges and said plastic cylindrical member terminating in outwardly extending second flanges, said first and second flanges cooperating to define spaces which receive a pair of boots engageable with the pair of pistons, respectively.

* * * * *